(12) United States Patent
Szabo et al.

(10) Patent No.: US 7,040,722 B2
(45) Date of Patent: May 9, 2006

(54) METHOD OF ESTIMATING THE RISK OF A VEHICLE OVERTURNING

(75) Inventors: Gergely Szabo, Budapest (HU); Tamás Dohany, Budapest (HU); Valér Merza, Szentendre (HU)

(73) Assignee: Knorr-Bremse Systeme Fuer Nutzfahrzeuge GmbH, Munich (DE)

( * ) Notice: Subject to any disclaimer, the term of this patent is extended or adjusted under 35 U.S.C. 154(b) by 15 days.

(21) Appl. No.: 10/380,678

(22) PCT Filed: Sep. 13, 2001

(86) PCT No.: PCT/EP01/10565

§ 371 (c)(1),
(2), (4) Date: Nov. 13, 2003

(87) PCT Pub. No.: WO02/22416

PCT Pub. Date: Mar. 21, 2002

(65) Prior Publication Data

US 2004/0119335 A1    Jun. 24, 2004

(30) Foreign Application Priority Data

Sep. 18, 2000    (DE) .................................. 100460364

(51) Int. Cl.
*B60T 8/00*    (2006.01)

(52) U.S. Cl. ........................ 303/191; 73/121; 180/282; 340/440; 701/1

(58) Field of Classification Search ................ 303/140, 303/146, 147, 191; 701/1, 38, 91, 72, 36, 701/45, 70, 110, 124; 280/6.159, 5.507, 280/755, 5.5, 5.502, 5.506, 735; 180/282, 180/284, 271, 197; 340/440; 702/41, 151; 73/121; 188/181 A; 307/7, 123, 140, 139, 307/199, 159; 318/586, 587

See application file for complete search history.

(56) References Cited

U.S. PATENT DOCUMENTS

| 3,797,893 | A |   | 3/1974  | Burckhardt et al. |
|-----------|---|---|---------|-------------------|
| 5,825,284 | A | * | 10/1998 | Dunwoody et al. ......... 340/440 |
| 5,869,943 | A | * | 2/1999  | Nakashima et al. ........ 318/586 |
| 6,002,975 | A | * | 12/1999 | Schiffmann et al. .......... 701/36 |
| 6,169,946 | B1| * | 1/2001  | Griessbach .................. 701/45 |
| 6,176,555 | B1| * | 1/2001  | Semsey ......................... 303/7 |
| 6,253,123 | B1| * | 6/2001  | Schramm et al. .............. 701/1 |

(Continued)

FOREIGN PATENT DOCUMENTS

DE    197 51 891    5/1999

(Continued)

*Primary Examiner*—Douglas C. Butler
(74) *Attorney, Agent, or Firm*—Crowell & Moring LLP

(57) ABSTRACT

The invention relates to a method for redundantly estimating, i.e. by various sub-methods, the risk of lateral overturn of a vehicle. One sub-method involves estimating the risk of overturn according to the actual braking state of the vehicle—braking or strong braking, or not braking or slight braking—by monitoring the rotational speed behavior of the wheels on the inside of the turn. Another sub-method involves pre-calculating the rolling motion of the vehicle about the longitudinal axis thereof over a short time span of, for example, 0.5 s to 1.5 s on the basis of instantaneous movement parameters and assessing the risk of overturn on the basis of the anticipated rolling motion.

22 Claims, 3 Drawing Sheets

U.S. PATENT DOCUMENTS

| | | | |
|---|---|---|---|
| 6,272,420 B1 * | 8/2001 | Schramm et al. | 701/72 |
| 6,278,930 B1 * | 8/2001 | Yamada et al. | 701/82 |
| 6,304,805 B1 * | 10/2001 | Onogi | 701/36 |
| 6,349,247 B1 * | 2/2002 | Schramm et al. | 701/1 |
| 6,366,844 B1 * | 4/2002 | Woywod et al. | 701/83 |
| 6,498,976 B1 * | 12/2002 | Ehlbeck et al. | 701/70 |
| 6,553,284 B1 * | 4/2003 | Holst et al. | 701/1 |
| 6,756,890 B1 * | 6/2004 | Schramm et al. | 340/440 |
| 6,772,625 B1 * | 8/2004 | Frank | 73/121 |

FOREIGN PATENT DOCUMENTS

| | | |
|---|---|---|
| DE | 198 56 303 | 1/2000 |
| EP | 0 684 150 | 11/1995 |
| WO | WO99/37516 * | 7/1999 |

* cited by examiner

METHOD OF ESTIMATING THE RISK OF A VEHICLE OVERTURNING

BACKGROUND AND SUMMARY OF THE INVENTION

The present invention relates to a method of estimating the overturn risk of a vehicle, in which the transverse acceleration of the vehicle is constantly determined, and as a function of the lateral acceleration, the rotational wheel speed behavior of the vehicle wheels is monitored.

From German Patent document DE 196 02 879 C1, a method of detecting the overturn risk of an ABS-equipped vehicle is known, during which the transverse acceleration of the vehicle is constantly monitored. When the transverse acceleration exceeds a defined limit value, a braking intervention takes place by means of a low testing brake power. In this case, it is monitored whether the testing brake power leads to an ABS intervention at the assigned wheel; that is, to a locking risk, which indicates that only a slight normal wheel force still exists or that the wheel has already lifted off the road and an overturn risk is present. Thus, solely the start of the ABS control intervention is used as an indication of an overturn risk.

It is an object of the invention to provide a method by means of which the overturn risk can be estimated still more reliably.

This object is achieved a method of estimating an overturn risk of a vehicle, in which the transverse acceleration of the vehicle is constantly determined, and as a function of the lateral acceleration, the rotational wheel speed behavior of the vehicle wheels is monitored. The overturn risk is determined redundantly, specifically a) as a function of whether the vehicle is braked or unbraked by monitoring the rotational wheel speed behavior, and b) by precalculating the rolling motion of the vehicle to be expected by using the transverse acceleration ($a_{trans}$). Advantageous developments and further developments of the invention are contained in the subclaims.

The basic principle of the invention consists of a method by which the risk of a vehicle laterally overturning can be estimated redundantly, that is, by means of various submethods.

In the case of one submethod, the risk of overturn is estimated as a function of the actual braking state of the vehicle—braking or strong braking, or not braking or slight braking—by monitoring the rotational wheel speed behavior of the wheels on the inside of the turn.

In the case of another submethod, the rolling motion of the vehicle about its longitudinal axis is precalculated over a short time span of, for example, 0.5 s to 1.5 s on the basis of instantaneous movement parameters. The risk of overturn is assessed on the basis of the anticipated rolling motion.

The risk of a lateral overturn of the vehicle during cornering can, therefore, be better estimated by the sequential or parallel implementation of different monitoring methods.

For determining the risk of overturn, the transverse acceleration of the vehicle or the angular acceleration about the longitudinal axis of the vehicle is sensed in a continuous manner. The exceeding of a defined transverse acceleration limit value is a first indication that the vehicle is in a critical situation in which an overturn risk may exist.

The method of examining whether an overturn risk actually exists is carried out as follows:

a) As a function of whether the vehicle is braked or not braked, when a defined transverse acceleration is exceeded, the brake pressure is changed at individual wheels and the occurring rotational wheel speed behavior is monitored.

If the vehicle is not braked, individual or more wheels are simultaneously acted upon by a low test brake pressure. If, as a result of the test brake pressure, the rotational wheel speed does not change or changes only very little, this is an indication of a sufficiently high normal wheel force on the road; that is, the wheel is not in danger of lifting off the road. If, in contrast, the wheel is already braked intensively by the slight test brake pressure, this is an indication of a low normal wheel force or that the wheel has already lifted off the road.

If the vehicle is braked, the brake pressure at an individual or several wheels is simultaneously lowered and it is monitored whether the rotational wheel speed changes little or greatly. If the rotational wheel speed changes little or not at all, this is an indication that the wheel has already lifted off or is just about to lift off. If, in contrast, the wheel is relatively strongly accelerated, it can be concluded that a sufficient normal wheel force still exists.

b) In addition, by means of instantaneous movement parameters of the vehicle, the rolling motion is precalculated for a time span of, for example, 0.5 to 1.5 s. For this purpose, particularly the transverse vehicle acceleration, the time gradient of the transverse vehicle acceleration, as well as the frequency or the period of vibration of the rolling motion of the vehicle about its longitudinal axis can be used. By means of defined motion equations, into which diverse vehicle parameters are entered, such as the mass of the unloaded vehicle, the loading condition, the position of the center of gravity of the vehicle, etc., the rolling motion to be expected and, thus, the risk of overturn of the vehicle can be estimated. The time span for which an estimation can be carried out depends on the vehicle speed. The higher the vehicle speed, the earlier a critical situation has to be recognized.

When a critical driving condition, that is, the overturn risk of the vehicle is recognized, a control intervention of the braking system takes place, for example, selectively at individual wheels, whereby the overturn risk is reduced and the vehicle is stabilized. If a driving situation is estimated to be critical in a different fashion, the control interventions considered to be required for stabilizing the driving will therefore also differ. Preferably, the control intervention with the highest braking demand will then be selected. In addition, the ABS system of the trailer vehicle is permitted to reduce the selected braking demand, so that the vehicle motion can be controlled during cornering.

A particularly advantageous field of application of the invention is the commercial vehicle field because, specifically in this field, accidents occur repeatedly as a result of an overturn of towing vehicles or trailer vehicles during cornering or during abrupt steering movements in danger situations.

The method is particularly suitable for semitrailer units because dangerous driving conditions, which are caused by dynamic vehicle movements and would lead to the overturn of the semitrailer, can be recognized more reliably and a braking intervention can be carried out in time.

The method is preferably implemented in an electronic control unit (ECU), which may be arranged on the towing vehicle or the trailer vehicle or semitrailer. If the control unit is arranged on the towing vehicle, the control unit is connected by means of a connection line with the ABS system of the trailer.

In the following, the invention will be explained in detail by means of an embodiment in connection with the drawing.

DETAILED DESCRIPTION OF THE DRAWINGS

The starting point for estimating the overturn risk of a vehicle is the determination of the transverse vehicle acceleration $a_{trans}$, which can be achieved, for example, by means of a lateral acceleration sensor provided in the vehicle.

Figure 1:
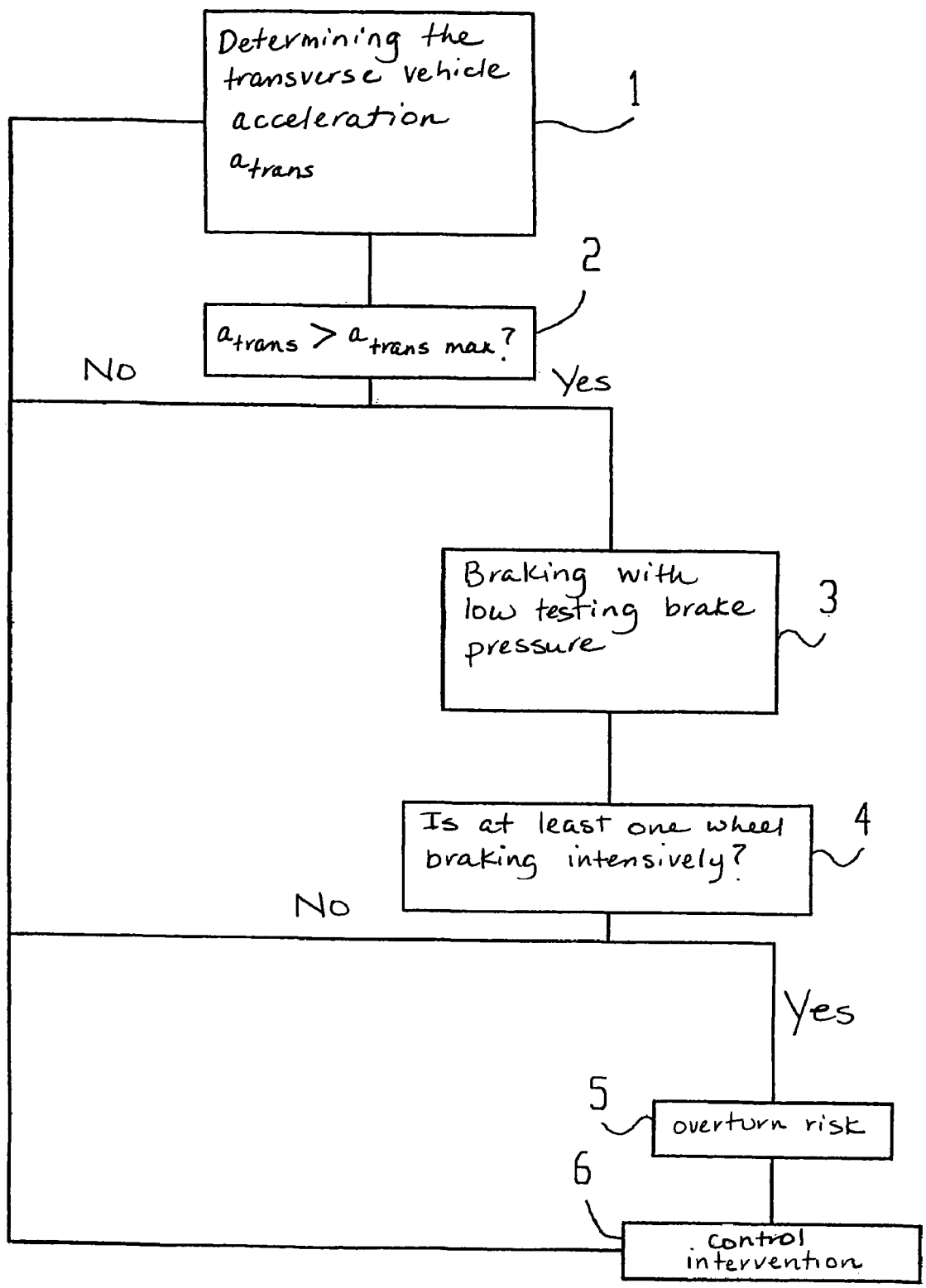
FIG. 1 is a flow chart of a method of estimating the overturn risk of an unbraked vehicle.

FIG. 1 is a flow chart for estimating the overturn risk of an unbraked vehicle, the transverse vehicle acceleration $a_{trans}$ being determined here in Step 1. "Unbraked" means that no braking demand signal is present from the driver. In Step 2, the sensed transverse vehicle acceleration $a_{trans}$ is compared with a defined transverse acceleration limit value $a_{trans\,max}$. If the sensed transverse vehicle acceleration $a_{trans}$ is lower than or equal to the defined transverse acceleration limit value $a_{trans\,max}$, it is assumed that an overturn risk does not exist. If the vehicle continues to be unbraked, a jump takes place back to Step 1.

If the sensed transverse vehicle acceleration $a_{trans}$ is higher than the defined transverse acceleration limit value $a_{trans\,max}$, on at least one or more vehicle wheels on the inside of the turn, the assigned vehicle brake is acted upon by a low test brake pressure. "Low" means that the test brake pressure is significantly lower than the brake pressure during a full braking and, during normal straight-ahead driving of the vehicle, results in no braking or only to an insignificant braking of the wheel or of the vehicle.

In Step 4, it is examined whether or how the rotational wheel speed behavior of the wheel of the brake acted upon by test brake pressure changes. If the rotational wheel speed does not change or changes only insignificantly, this leads to the conclusion that a sufficiently high normal wheel force is present at the considered wheel on the inside of the turn, which causes the wheel to rotate along, and that therefore no overturn risk is present. In this case, Step 1 is restarted. In contrast, if the wheel is braked intensively, this indicates a condition 5 in which an overturn risk exists.

In this event, a control intervention by the braking system takes place in Step 6. As a result of a possibly wheel-selective braking intervention, the normal wheel force will increase again and the overturn risk will be reduced. If the vehicle continues to be unbraked, Step 1 will be started again.

Figure 2:
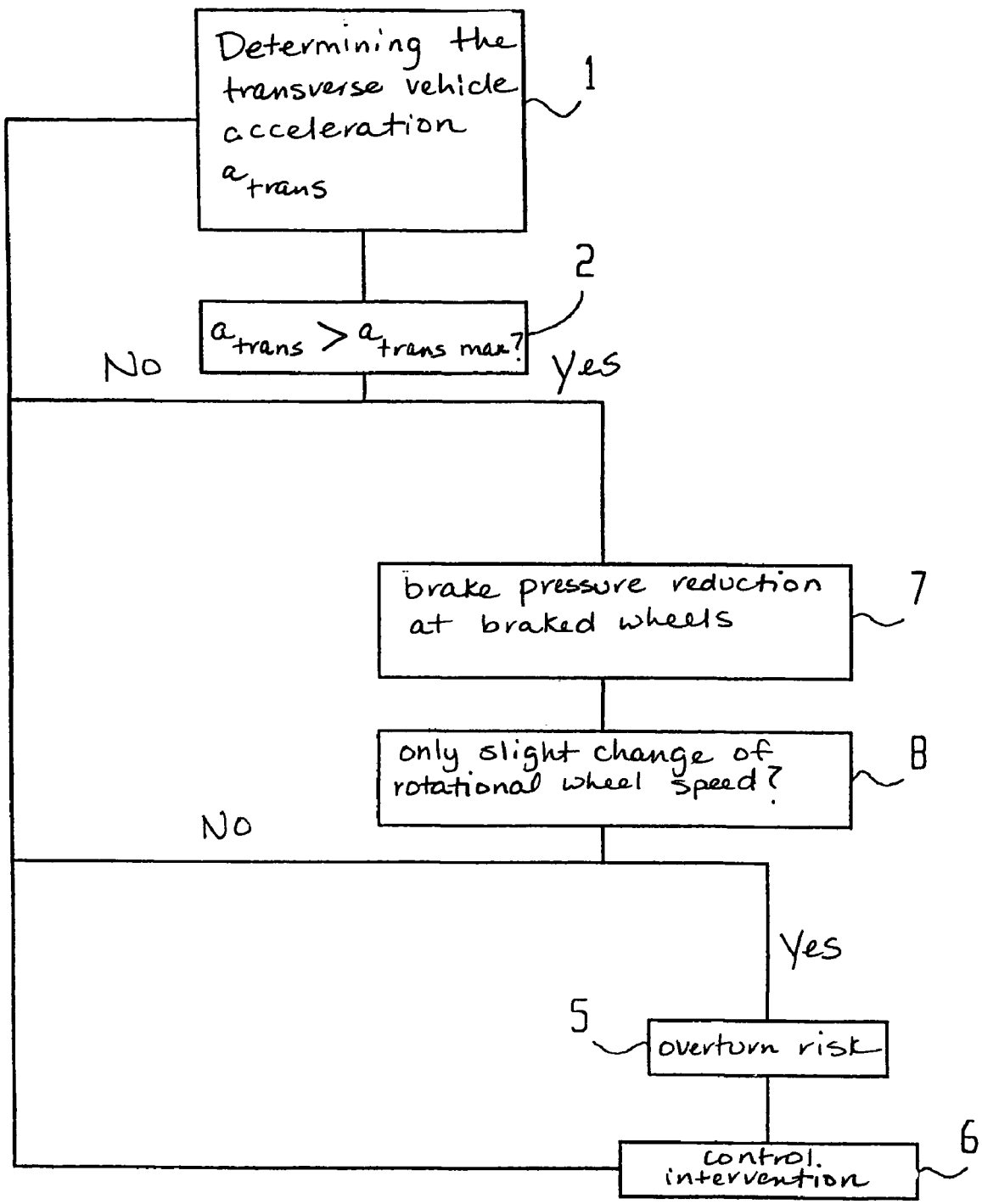
FIG. 2 is a flow chart for estimating the overturn risk of a braked vehicle.

FIG. 2 is a flow chart for estimating the overturn risk of a braked vehicle. "Braked" means that the driver defines a brake pressure by way of the brake pedal, which brake pressure is higher than the above-mentioned test brake pressure. Corresponding to FIG. 1, the transverse vehicle acceleration $a_{trans}$ is determined in Step 1, and it is examined in Step 2 whether the sensed transverse vehicle acceleration $a_{trans}$ is higher or lower than, or equal to, the defined transverse acceleration limit value $a_{trans\,max}$.

If the sensed transverse vehicle acceleration $a_{trans}$ is higher than the transverse acceleration limit value $a_{trans\,max}$, in Step 7, the brake pressure defined by the driver is lowered for a short time at one or more wheels on the inside of the turn. In Step 8, the occurring change of the rotational wheel speed is then monitored. If the rotational wheel speed of the examined wheel or wheels on the inside of the turn changes only little, it can be concluded that no normal wheel force or only a slight normal wheel force is still present; that is, that the assigned wheel is just about to be lifted off the road or has already lifted off and is therefore no longer accelerated. It should therefore be assumed that an overturn risk exists in condition 5, which risk is reduced by a control intervention of the braking system in Step 6.

Figure 3:
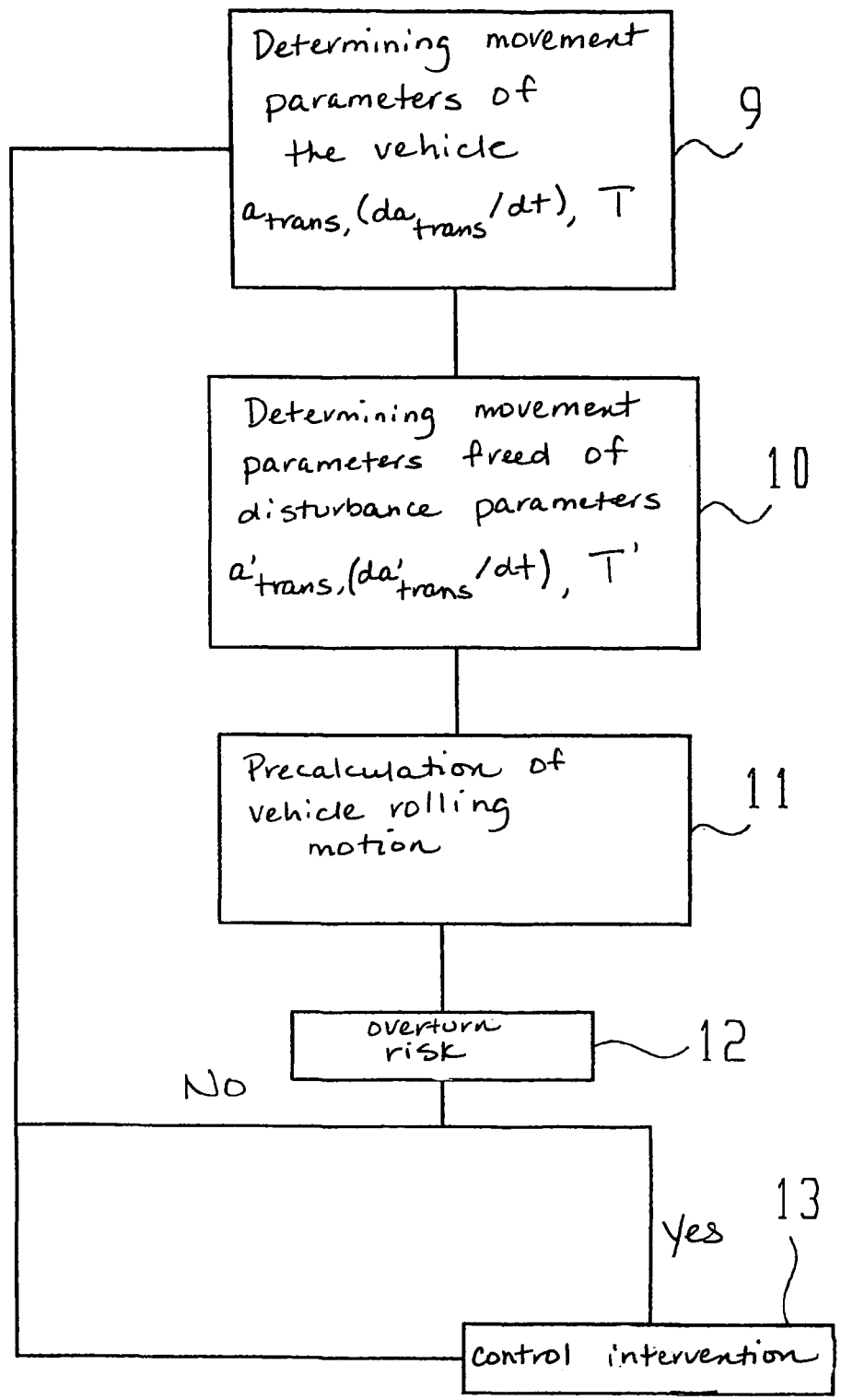
FIG. 3 is a flow chart for estimating the overturn risk on the basis of instantaneous movement parameters of the vehicle.

FIG. 3 describes a method of estimating the overturn risk on the basis of instantaneous movement parameters of the vehicle. In the case of this method, the transverse vehicle acceleration $a_{trans}$ as well as additional parameters characterizing the directional control, such as the time derivation of the transverse vehicle acceleration $da_{trans}/dt$ and the period duration T of a rolling motion of the vehicle, are determined in Step 9.

When sensing the transverse vehicle acceleration $a_{trans}$ by means of a transverse acceleration sensor, diverse signal peaks may occur in the course of the transverse acceleration signal, which peaks are generated, for example, by noise signals, vehicle vibrations or shocks because of road unevennesses. In Step 10, such "disturbance parameters" are filtered out of the signals determined in Step 9, which results in the parameters $a'_{trans}$, $da'_{trans}/dt$, T', which are freed of disturbance parameters.

By means of defined motion equations of the vehicle, in Step 11, the expected rolling motion of the vehicle is precalculated for an imminent short time span of, for example, 0.5 to 1.5 s. Diverse vehicle-specific parameters can be entered into these motion equations, for example, the vehicle mass in the unloaded condition, the position of the center of gravity of the vehicle, spring/damping parameters of the vehicle, the momentary engine torque as well as "marginal conditions", such as the road inclination, etc.

By means of the precalculated rolling motion, it can be estimated whether an overturn risk exists in Condition 12. Analogous to the methods explained in FIGS. 1 and 2, in the event of the existence of an overturn risk, a control intervention (Step 6) of the braking system takes place which reduces the overturn risk.

Particularly, the method described in FIG. 3 permits a timely recognition of dangerous driving-dynamic conditions, for example, in a decreasing radius turn, in the event of a multiple lane change, during a suddenly initiated longer-lasting steering movement, etc., which may lead to an overturn situation.

The methods described in FIGS. 1 to 3 can be carried out separately. However, it is particularly advantageous for the methods to be used redundantly, that is, jointly for the recognition of critical driving conditions.

The invention claimed is:

1. A method of estimating an overturn risk of a vehicle, in which a transverse acceleration of the vehicle is constantly determined, and a rotational wheel speed behavior of the vehicle wheels is monitored, the method comprising the acts of:

determining the overturn risk specifically:
    a) by precalculating a rolling motion of the vehicle to be expected by using the transverse acceleration,
       and redundantly
    b) as a function of the transverse acceleration and as a function of whether the vehicle is braked or unbraked through a braking intervention by monitoring the rotational wheel speed behaviour,
    wherein, in a case of a braked vehicle, a brake pressure is lowered at vehicle brakes of wheels on the inside of a turn.

2. Method according to claim 1, wherein, in act b), estimation of the overturn risk is carried out only when a defined transverse acceleration ($a_{trans\ max}$) is exceeded.

3. Method according to claim 2, wherein, in act b), in the case of an unbraked vehicle, a testing brake pressure is applied to a vehicle brake of an assigned wheel which test brake pressure is low with respect to a brake pressure of a full braking, and further wherein the existence of an overturn risk is assumed when the test brake pressure results in a strong braking of the assigned wheel.

4. Method according to claim 2, wherein, in act b), in the case of a braked vehicle, the brake pressure of a vehicle brake of an assigned wheel is lowered, and further wherein the existence of an overturn risk is assumed when the rotational wheel speed of the assigned wheel increases only a little or not at all.

5. Method according to claim 2, wherein a time variation of the transverse acceleration ($da_{trans}/dt$) is used when precalculating the rolling motion.

6. Method according to claim 2, wherein a vibration period (T) or a frequency of the instantaneous rolling motion of the vehicle is used when precalculating the rolling motion.

7. Method according to claim 2, wherein the expected rolling motion of the vehicle is precalculated for 0.5 to 1.5 s.

8. Method according to claim 1, wherein, in the case of an unbraked vehicle, a testing brake pressure is applied to a vehicle brake of an assigned wheel which test brake pressure is low with respect to a brake pressure of a full braking, and further wherein the existence of an overturn risk is assumed when the test brake pressure results in a strong braking of the assigned wheel.

9. Method according to claim 8, wherein, in the case of a braked vehicle, the brake pressure of a vehicle brake of an assigned wheel is lowered, and further wherein the existence of an overturn risk is assumed when the rotational wheel speed of the assigned wheel increases only a little or not at all.

10. Method according to claim 9, wherein a time variation of the transverse acceleration ($da_{trans}/dt$) is used when precalculating the rolling motion.

11. Method according to claim 9, wherein a vibration period (T) or a frequency of the instantaneous rolling motion of the vehicle is used when precalculating the rolling motion.

12. Method according to claim 9, wherein the expected rolling motion of the vehicle is precalculated for 0.5 to 1.5 s.

13. Method according to claim 1, wherein, in the case of a braked vehicle, the brake pressure of a vehicle brake of an assigned wheel is lowered, and further wherein the existence of an overturn risk is assumed when the rotational wheel speed of the assigned wheel increases only a little or not at all.

14. Method according to claim 1, wherein, in act a), a time variation of the transverse acceleration ($da_{trans}/dt$) is used when precalculating the rolling motion.

15. Method according to claim 1, wherein, in act a), a vibration period (T) or a frequency of the instantaneous rolling motion of the vehicle is used when precalculating the rolling motion.

16. Method according to claim 1, wherein, in act a), before the precalculation, disturbing influences are filtered out of sensed movement parameters of the vehicle used for this purpose.

17. Method according to claim 1, wherein, in act a), the expected rolling motion of the vehicle is precalculated for 0.5 to 1.5 s.

18. Method according to claim 1, further comprising the acts of:
when an overturn risk is determined, performing a braking intervention of the braking system of the vehicle to reduce the overturn risk.

19. Method according to claim 1, wherein, when an overturn risk is recognized, on the basis of acts a) and b), a braking intervention for the braking system is determined in each case, and that braking intervention is carried out which has a higher braking demand.

20. Method according to claim 1, wherein, in act b), the rotational wheel speed behavior of wheels on the inside of the turn is monitored.

21. Method according to claim 8, wherein, in the case of an unbraked vehicle, the test pressure is applied to vehicle brakes of wheels on the inside of the turn.

22. Method of estimating an overturn risk of a vehicle, in which a transverse acceleration of the vehicle is constantly determined and, as a function of a lateral acceleration, a rotational wheel speed behavior of the vehicle wheels is monitored, the method comprising the acts of:
determining the overturn risk redundantly, specifically: a) by precalculating a rolling motion of the vehicle to be expected by using the transverse acceleration ($a_{trans}$) and b) as a function of whether the vehicle is braked or unbraked by monitoring the rotational wheel speed behavior,
wherein, in the case of a braked vehicle, the braking pressure of a vehicle brake is lowered and it is assumed that an overturn risk exists when the rotational wheel speed of an assigned wheel increases only a little or not at all, and
further wherein in the case of a braked vehicle, the braking pressure is lowered at vehicle brakes of wheels on the inside of a turn.

* * * * *